United States Patent Office 3,399,222
Patented Aug. 27, 1968

3,399,222
REDISTRIBUTION OF HYDROGEN AND HALOGEN ON SILANES
Donald R. Weyenberg, Midland, Mich., assignor to Dow Corning Corporation, Midland, Mich., a corporation of Michigan
No Drawing. Continuation-in-part of application Ser. No. 429,142, Jan. 29, 1965. This application Oct. 28, 1966, Ser. No. 590,228
9 Claims. (Cl. 260—448.2)

ABSTRACT OF THE DISCLOSURE

Quaternary ammonium halides and quaternary phosphonium halides are used as catalysts for the redistribution of silicon-bonded hydrogen and silicon-bonded chlorine or fluorine atoms in silanes. For example, methyldichlorosilane is heated with tetra-butylammonium chloride at 160° C. for 20 hours and rearranges to $CH_3SiCl_3$ and $CH_3SiClH_2$.

This invention is a continuation-in-part of applicant's copending application Ser. No. 429,142, filed Jan. 29, 1965, entitled, "Redistribution of Hydrogen and Chlorine on Silanes," now abandoned.

This invention relates to a method of rearranging the H and chlorine or fluorine atoms in a silane of the formula (a) $R_nSiX_{4-n}$ in which R is a monovalent hydrocarbon radical or a monovalent halohydrocarbon radical, X is H, Cl or F and $n$ has a value from 0 to 3 which comprises contacting said silane (a) in which there is both SiH bonds and SiX' bonds where X' is Cl or F with (b) a catalyst of the group consisting of $R'_4NY$ and $R'_4PY$ in which R' is a monovalent hydrocarbon radical and Y is a halogen atom.

The redistribution reaction generally yields at least traces of the products of all possible redistribution combinations that can occur. Seldom, however, are these various products present in the amounts predicted by a random redistribution of the silane hydrogen and halogen. For example, the equilibria in the chlorine-hydrogen redistributions usually favor the combinations of silanes having the most even distribution of chlorine among the silicon atoms. Thus, the following equilibrium lies far to the right $(CH_3)_2HSiCl + RSiCl_3 \rightleftarrows (CH_3)_2SiCl_2 + RHSiCl_2$ With the fluorine-hydrogen system, however, the opposite is often true and the accumulation of several fluorines about a silicon atom is favored. Thus, the following equilibrium lies far to the right $C_6H_5(CH_3)SiHF \rightleftarrows C_6H_5(CH_3)SiH_2 + C_6H_5(CH_3)SiF_2$ In many cases where the equilibria are unfavorable, e.g.:

$CH_3HSiCl_2 \rightleftarrows CH_3H_2SiCl\uparrow + CH_3SiCl_3$ acceptable yields can be obtained by removing the more volatile component as it is formed.

R can be any monovalent hydrocarbon radical, e.g., alkyl radicals such as methyl, ethyl, isopropyl, sec-hexyl, 2-ethylhexyl, or octadecyl; cycloalkyl radicals such as cyclohexyl or cyclopentyl; aliphatically unsaturated radicals such as vinyl, allyl, hexenyl, cyclopentenyl, or butadienyl; or aryl-containing radicals such as phenyl, tolyl, benzyl, biphenyl, or naphthyl.

R can also be any monovalent halohydrocarbon radical, e.g., haloalkyl radicals such as 3-chloropropyl, 3,3,3-trifluoropropyl, or 4-bromohexyl; halocycloalkyl such as bromocyclopentyl or difluorocyclohexyl; aliphatically unsaturated radicals such as chloroallyl or chlorocyclohexenyl; and aryl-containing radicals such as chlorophenyl, dibromophenyl, α,α,α-trifluorotolyl, or bromonaphthyl.

R' can be any monovalent hydrocarbon radical such as those shown for R above.

Y can be any halogen, e.g., fluorine, chlorine, bromine or iodine.

Temperature and reaction time are not critical for the process of this invention, but it is preferred to operate the reaction at a temperature of 20° to 160° C.

The concentration of catalyst is likewise not critical, but it is preferred to use from 0.1 to 5 weight percent of catalyst, based on the weight of the silane reactant.

By "silane reactant" it is meant the entire reaction mixture minus the catalyst. Generally the silane reactant will consist entirely of the silane or silanes to be arranged, but solvents can be added if a compatibility problem exists between two silanes to be rearranged, and other additives also may be desirable to enhance the reaction. It is preferable for at least 25 weight percent of the silane reactant to consist of silanes to be rearranged.

This reaction can be used to produce hydrochlorosilanes in the following manner:

$(CH_3)_2SiH_2 + RSiCl_3 \rightleftarrows (CH_3)_2SiHCl + RSiHCl_2$ etc., where R is as defined above.

Similarly, hydrosilanes and fluorosilanes can be produced from hydrofluorosilanes by the process of this invention:

$(CH_3)_2SiHF \rightleftarrows (CH_3)_2SiH_2 + (CH_3)_2SiF_2$

The following examples are illustrative only and should not be construed as limiting the invention which is properly delineated in the appended claims.

EXAMPLE 1

A mixture of 0.55 ml. of methyldichlorosilane and a trace amount (a small crystal) of tetrabutylammonium chloride catalyst was sealed in a tube and heated at 160° C. for 20 hours. The tube was then cooled and analyzed by nuclear magnetic resonance spectroscopy, which indicated that the tube contained the following:

| | Mol percent |
|---|---|
| Methyldichlorosilane | ~66 |
| Methyltrichlorosilane | ~20 |
| Methylchlorosilane | ~14 |

EXAMPLE 2

The experiment of Example 1 was twice repeated, substituting for the catalyst of Example 1 tetrabutylammonium bromide in one case and tetrabutylammonium iodide in the other.

The two reaction mixtures were heated for 24 hours at 100° C. to yield in each case the same products in the same proportions as in Example 1.

EXAMPLE 3

The experiment of Example 1 was repeated, substituting tetrabutylphosphonium bromide for the catalyst of Example 1.

The reaction mixture was heated at 100° C. for 14 hours to yield the following products:

| | Mol percent |
|---|---|
| Methyldichlorosilane | ~68 |
| Methyltrichlorosilane | ~16 |
| Methylchlorosilane | ~16 |

EXAMPLE 4

Two 0.55 ml. samples of trichlorosilane were catalyzed with a trace of tetrabutylammonium chloride in one case, and a trace of tetrabutylphosphonium bromide in the other.

The samples were allowed to stand at room temperature for 24 hours to yield in both cases a mixture of trichlorosilane, dichlorosilane, and silicon tetrachloride.

When a mixture of dichlorosilane and silicon tetrachloride are reacted under the above conditions, trichlorosilane is formed.

EXAMPLE 5

A trace of tetrabutylammonium chloride was added to 0.55 ml. of dimethylchlorosilane. This was heated at 100° C. for 16 hours to yield a mixture of dimethylchlorosilane, dimethylsilane, and dimethyldichlorosilane.

EXAMPLE 6

To 0.0015 mole each of dimethylchlorosilane and methyltrichlorosilane there was added a trace of tetrabutylammonium chloride. This mixture was allowed to stand for 11 days at room temperature to yield, by N.M.R. analysis

| | Mol percent |
|---|---|
| Dimethylchlorosilane | ~3 |
| Methyltrichlorosilane | ~16 |
| Methyldichlorosilane | ~41 |
| Dimethyldichlorosilane | ~39 |

EXAMPLE 7

To 1 mole of dimethylchlorosilane and 1.5 moles of 3,3,3-trifluoropropyltrichlorosilane there was added 4.4 g. of tetrabutyl ammonium chloride. This mixture was heated at 60° to 80° C. for 20 hours to give an 82 percent yield of 3,3,3-trifluoropropyldichlorosilane, along with dimethylchlorosilane, 3,3,3-trifluoropropyltrichlorosilane, and dimethyldichlorosilane.

EXAMPLE 8

To 1 mole of dimethylchlorosilane and 2 moles of phenyltrichlorosilane there was added 5.2 g. of tetrabutylammonium chloride and 9.7 g. of hexadecyloctadecyldimethylammonium chloride. This mixture was heated at 60° to 80° C. for 48 hours to give a 65 percent yield of phenyldichlorosilane, plus dimethylchlorosilane, phenyltrichlorosilane, dimethyldichlorosilane, and phenylchlorosilane.

EXAMPLE 9

When 0.2 mole of vinylhexyldichlorosilane and 0.1 mole of octadecyldimethylsilane are mixed with 1 weight percent of benzyldecyldimethylphosphonium chloride, based on the silane weight, and 0.3 mole of o-dichlorobenzene as a dispersing agent, and this mixture is heated at 60° C. for 20 hours, the products vinylhexylchlorosilane and octadecyldimethylchlorosilane are formed.

EXAMPLE 10

When 0.1 mole of dimethylsilane, 0.4 mole of dibromophenyltrichlorosilane, and 1 mole of xylene as a dispersing agent is heated in a bomb at 125° C. with 4 weight percent, based on the reaction mixture weight, of 4-hexenyldiphenylmethylammonium chloride, the products dimethyldichlorosilane, dimethylchlorosilane, dibromophenylchlorosilane, and dibromophenyldichlorosilane are formed.

EXAMPLE 11

One mole of dimethylchlorosilane and 1.25 moles of decyltrichlorosilane were heated at 60° to 80° C. for 4 days with 4.4 g. of tetrabutylammonium chloride and 8.8 grams of hexadecyloctadecyldimethylammonium chloride to give a 45 percent yield of decyldichlorosilane.

EXAMPLE 12

0.3 ml. of diphenylmethylsilane and 0.18 ml. of methyltrichlorosilane were heated in a sealed tube with a trace of tetrabutylammonium chloride at 100° C. for 2 hours.

Vapor phase chromatography indicated that diphenylmethylchlorosilane and methyldichlorosilane were produced.

EXAMPLE 13

Phenylmethylmonofluorosilane was heated in a sealed tube at 100° C. for 66 hours in the presence of 1% by weight tetrabutylammonium fluoride to give a mixture of 48 mol percent phenylmethyldifluorosilane and 44.7 mol percent phenylmethylsilane.

Equivalent results were obtained when 1% by weight tetrabutyl ammonium chloride was used as the catalyst.

EXAMPLE 14

1 part by weight of a mixture of phenyldimethylfluorosilane and phenylmethylsilane in a mol ratio of 2:1 were placed in a sealed tube with 0.05 part by weight tetrabutylammoniumfluoride and 0.1 part by weight benzene and the mixture was heated at 100° C. for 48 hours. The products obtained were:

| | Mol percent |
|---|---|
| Phenyldimethylsilane | 38.1 |
| Phenyldimethylfluorosilane | 35.4 |
| Phenylmethylsilane | 10.0 |
| Phenylmethyldifluorosilane | 15.5 |

Equivalent results were obtained when the starting silane mixture was phenyldimethylsilane and phenylmethyldifluorosilane in the molar ratio of 2:1.

EXAMPLE 15

Phenyldifluorosilane was mixed with 1% by weight tetrabutylammonium chloride and heated in a sealed tube for 19 hours at 100° C. The products were:

| | Mol percent |
|---|---|
| Phenylsilane | 32.0 |
| Phenyltrifluorosilane | 60.0 |
| Phenyldifluorosilane | 8.0 |

Equivalent results are obtained when tetrabutylammonium fluoride was used as a catalyst.

EXAMPLE 16

A mixture of phenylsilane and phenyltrifluorosilane was used in the process of Example 15. The products obtained were:

| | Mol percent |
|---|---|
| Phenylsilane | 45.6 |
| Phenyltrifluorosilane | 47.0 |
| Phenyldifluorosilane | 7.4 |

That which is claimed is:

1. A method of rearranging the hydrogen and chlorine or fluorine substituents in a silane reactant selected from the group consisting of a silane and a mixture of silanes, each silane involved being of the formula (a) $\quad R_nSiX_{4-n}$ in which R is selected from the group consisting of monovalent hydrocarbon and halohydrocarbon radicals, X is selected from the group consisting of hydrogen, chlorine and fluorine, n is an integer of 0 to 3, comprising contacting said silane reactant in which there is both SiH bonds and SiX' bonds in which X' is chlorine or fluorine, with (b) a catalyst selected from the group consisting of quaternary ammonium salts of the formula $R'_4NY$ and quaternary phosphonium salts of the formula $R'_4PY$, where R' is a monovalent hydrocarbon radical and Y is a halogen atom.

2. The process of claim 1 where the reaction temperature is from 20° to 160° C.

3. The process of claim 1 where from 0.1 to 5 weight percent of catalyst, based on the weight of the silane reactant, is present.

4. The process of claim 1 where the silane reactant comprises a mixture of dimethylchlorosilane and $RSiCl_3$, where R is as defined in claim 1.

5. The process of claim 1 where the silane reactant comprises a mixture of dimethylsilane and RSiCl₃, where R is as defined in claim 1.

6. The process of claim 1 where the silane reactant comprises a mixture of dimethylchlorosilane and 3,3,3-trifluoropropyltrichlorosilane.

7. The process of claim 1 where the silane reactant comprises a mixture of dimethylchlorosilane and phenyltrichlorosilane.

8. The process of claim 1 where the silane reactant comprises a mixture of decyltrichlorosilane and dimethylchlorosilane.

9. The process of claim 1 in which the silane reactant is a mixture of methyldichlorosilane and 3,3,3-trifluoropropyltrichlorosilane.

References Cited

UNITED STATES PATENTS 2,842,580   7/1958   Gilbert et al. _____ 260—448.2

HELEN M. McCARTHY, *Primary Examiner.*

J. PODGORSKI, *Assistant Examiner.*